United States Patent [19]

Toth

[11] 3,945,921

[45] Mar. 23, 1976

[54] ROTARY CENTRIFUGAL MACHINE

[75] Inventor: Alex Toth, Lincolnwood, Ill.

[73] Assignee: Ellis Corporation, Chicago, Ill.

[22] Filed: Dec. 12, 1974

[21] Appl. No.: 532,205

[52] U.S. Cl. .................. 210/78; 210/144; 210/148; 210/376

[51] Int. Cl.[2] .......................................... B01D 33/38

[58] Field of Search ........... 210/144, 148, 370, 371, 210/376

[56] References Cited

UNITED STATES PATENTS

| | | | |
|---|---|---|---|
| 2,360,455 | 10/1944 | Vilter | 210/376 |
| 2,548,515 | 4/1951 | Broadbent | 210/376 X |
| 3,308,954 | 3/1967 | Powder | 210/144 X |

*Primary Examiner*—John Adee
*Attorney, Agent, or Firm*—Mason, Kolehmainen, Rathburn & Wyss

[57] ABSTRACT

A rotary centrifugal machine, for example a centrifugal extractor for removing fluids from wet laundry loads, includes a basket rotatable within a casing. A load conveyor deposits material into the basket while the basket rotates at a relatively low speed. After loading, the speed of basket rotation is increased to subject material within the basket to centrifugal forces. Unloading of material from the basket is accomplished by lifting a movable wall from the bottom to the top of the basket during low speed rotation of the basket so that material lifted above the basket wall is centrifugally thrown outward from the basket. The casing and basket are suspended by pedestal assemblies and pneumatic biasing assemblies for damping and resisting lateral casing movement. A switch operated by casing movement senses load imbalance. Automatic redistribution of an unbalanced load is effected by unloading the material and reloading it in a distributed condition. Load discharge and load recycling are carried out by an arrangement of conveyors surrounding the basket.

16 Claims, 11 Drawing Figures

ROTARY CENTRIFUGAL MACHINE

The present invention relates to improvements in rotating centrifugal machines and to improved unloading and automatic load balancing arrangements for such machines.

A rotating centrifugal machine includes a rotatable structure such as a basket or inner casing into which material is placed. Upon rotation of the basket, the material contained therein is subjected to centrifugal force. Machines of this character are of many types and are used for many purposes. Examples are centrifugal extractors wherein a perforated or fluid pervious basket is used and wherein fluids are extracted from material within the basket; centrifugal filters wherein a fluid to be filtered is driven by centrifugal force through a filtering medium; and centrifugal separators wherein relatively more dense and less dense materials are separated by centrifugal action. The illustrated embodiment of the present invention comprises a centrifugal extractor useful in commercial laundry operation, but features of the present invention are applicable to rotary centrifugal machines of many types.

One problem which arises in the use of centrifugal machines such as laundry extractors is that of unloading material from the extractor. In a typical arrangement, after an extraction cycle is completed, the rotating basket is stopped and the operator of the machine unloads material from the basket. This is obviously a laborious and time consuming process.

In order to overcome this problem, there have been developed centrifugal machines wherein all or part of the basket may be removed from the machine with the load contained therein so that the individual constituents of the load need not be handled separately. This approach has not been entirely satisfactory because after the basket and load are removed from the machine, it is still necessary to remove the load from the basket structure. Another disadvantage is that the load is delivered in a batch, rather than in a distributed array. The modern tendency in many fields including the commercial laundry field is to provide equipment making possible continuous rather than batch operations. Although rotary extraction requires the rotation of material is discrete batches, nevertheless it would be desirable to provide equipment wherein material is unloaded from the extractor in a distributed rather than in a bunched condition.

Another problem arising in connection with rotary centrifugal machines is that of load imbalance. Since the basket and load are typically rotated at substantial speeds in order to develop the desired centrifugal forces, when material is not uniformly distributed and balanced around the circumference of the basket, substantial eccentric forces can result. Although drive arrangements, suspension systems and bearings can be developed to withstand substantial eccentric forces, nevertheless in any given arrangement there comes a point where the imbalance is so severe that proper operation is prevented or damage results. In the past, when difficulties were encountered due to an unbalanced load, it was necessary to stop the rotating machine and to redistribute the load hopefully to overcome the inbalance problem. An important disadvantage of this approach is that it requires substantial operator attention and time during the extraction process.

Important objects of the present invention are to provide improvements in rotary centrifugal machines; to provide improvements in unloading arrangements for rotary centrifugal machines; to provide structure for automatically redistributing unbalanced loads in rotary centrifugal machines; to provide a rotary centrifugal machine well suited for use in continuous rather than batch processes; to provide a machine which is highly automatic in operation and thus requires minimal operator supervision; and to provide improvements in rotary centrifugal machines overcoming disadvantages of prior arrangements.

In brief, in accordance with the above and other objects of the present invention there is provided a rotary centrifugal machine including an inner casing or basket mounted for rotation about a rotational axis together with drive means for rotating the basket and speed control means for controlling the rotation of the basket at relatively high and relatively low speeds. A load conveyor is provided for depositing a load of material into the basket while the basket is rotating at relatively low speed thereby to provide initial load distribution around the circumference of the macine without manual load positioning.

In accordance with an important feature of the invention, there is provided a novel unloading arrangement for the machine. Located within the inner casing or basket is a wall member movable between a lower position and an upper position for raising material within the basket to a level above the basket. The wall member is movable during rotation of the machine so that the constituents of the load are centrifugally flung outwardly and thus are distributed around the machine. A collection arrangement including a number of conveyors transports the distributed load in distributed fashion from the machine.

In accordance with a further important feature of the present invention, there is provided a novel load redistribution arrangement. The basket or inner casing is supported for rotation within an outer casing or enclosure, the assembly of the inner and outer casings being suspended by means of a number of pedestal assemblies and pneumatic biasing structures. In response to predetermined lateral movement of the outer casing caused by load imbalance, a sensing device operates a control circuit to slow the basket structure, to operate the unloading arrangement, and to reload the unloaded material in distributed fashion back into the inner casing or basket.

The invention together with the above and other objects and advantages thereof will be best understood from consideration of the embodiment of the invention illustrated in the accompanying drawings, wherein.

Figure 1:
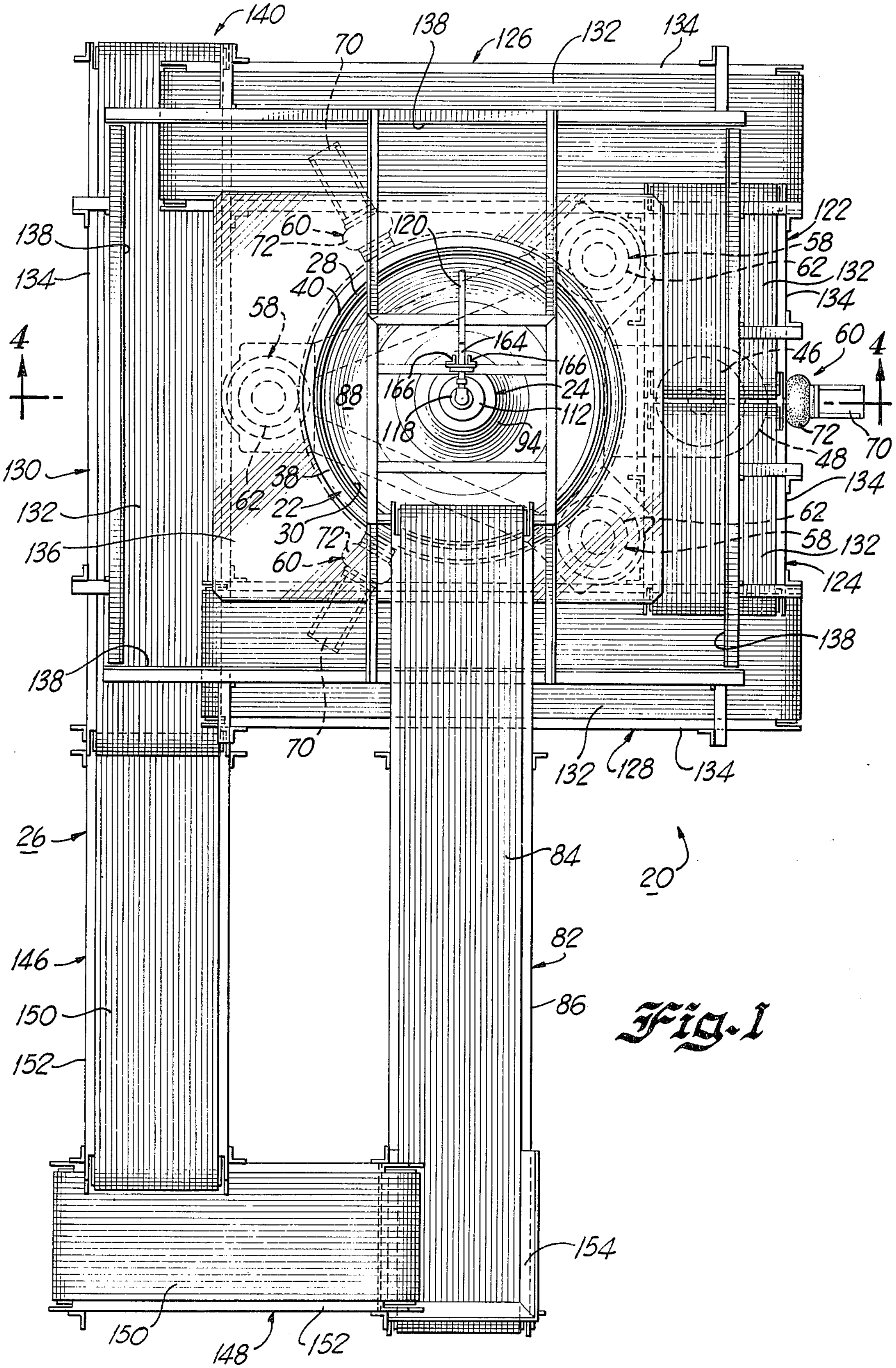
FIG. 1 is a top plan view of rotary centrifugal machine constructed in accordance with the present invention.

Having reference now to the drawings and initially to FIGS. 1–8, there is illustrated a rotary centrifugal machine constructed in accordance with the principles of the present invention and designated in its entirety by the reference numeral 20. In the illustrated arrangement, the machine 20 comprises a centrifugal extractor useful for example in commercial laundry operations for extracting fluids from laundry material. It should be understood however that principles of the present invention are applicable to rotary centrifugal machines of many sorts.

In general the machine 20 includes a basket assembly generally designated as 22 into which a load is placed for rotation. In accordance with a feature of the invention, an unloading arrangement generally designated as 24 is provided for unloading material from the basket assembly 22 in an automatic manner and in a distributed array. Associated with the basket assembly 22 and unloading assembly 24 the machine 20 includes an array of conveyors designated as a whole by the reference numeral 26 for discharging unloaded material from the machine and, in accordance with a feature of the invention, for acting in concert with the unloading assembly 24 to redistribute and reload an unbalanced load of material into the basket assembly 26.

Proceeding now to a more detailed description of the construction and operation of the machine 20, the basket assembly 22 includes an inner casing or basket 28 comprised of a perforated or liquid permeable generally cylindrical outer wall 30 and a lower or base wall 32. Basket 28 is mounted for rotation and the base wall 32 includes an inner generally bell-shaped portion 34 terminating in a hub 35 carried on a rotatable spindle shaft or assembly 36.

Surrounding the basket 28, the assembly 22 further includes an outer casing or enclosure 38 having a generally cylindrical wall 40 surrounding the basket wall 30. A lower or base wall 42 of the casing 38 supports a bearing assembly 44 located within bell-shaped wall 34 of the basket 28 and within which the spindle assembly 36 is rotatably mounted. Suitable drain structure (not shown) is provided for liquids extracted from material within the basket 28.

In order to rotate the basket 28 within the outer casing or enclosure 38, a drive motor 46 is carried by a motor bracket 48 in turn supported by the basket assembly 22. The drive motor 46 is drivingly coupled to the spindle assembly 36 and thus to the basket 28 by means of a number of drive belts 50 and a brake assembly 52. A pneumatic actuator 54 is connected to the brake assembly 52 for releasing the brake assembly 52 and permitting rotation of the spindle assembly 36 upon pressurization of the actuator. In order to provide a signal indicating release of the brake assembly, a brake sensing switch 56 is located to be operated upon pressurization of the actuator 54.

Figure 4:
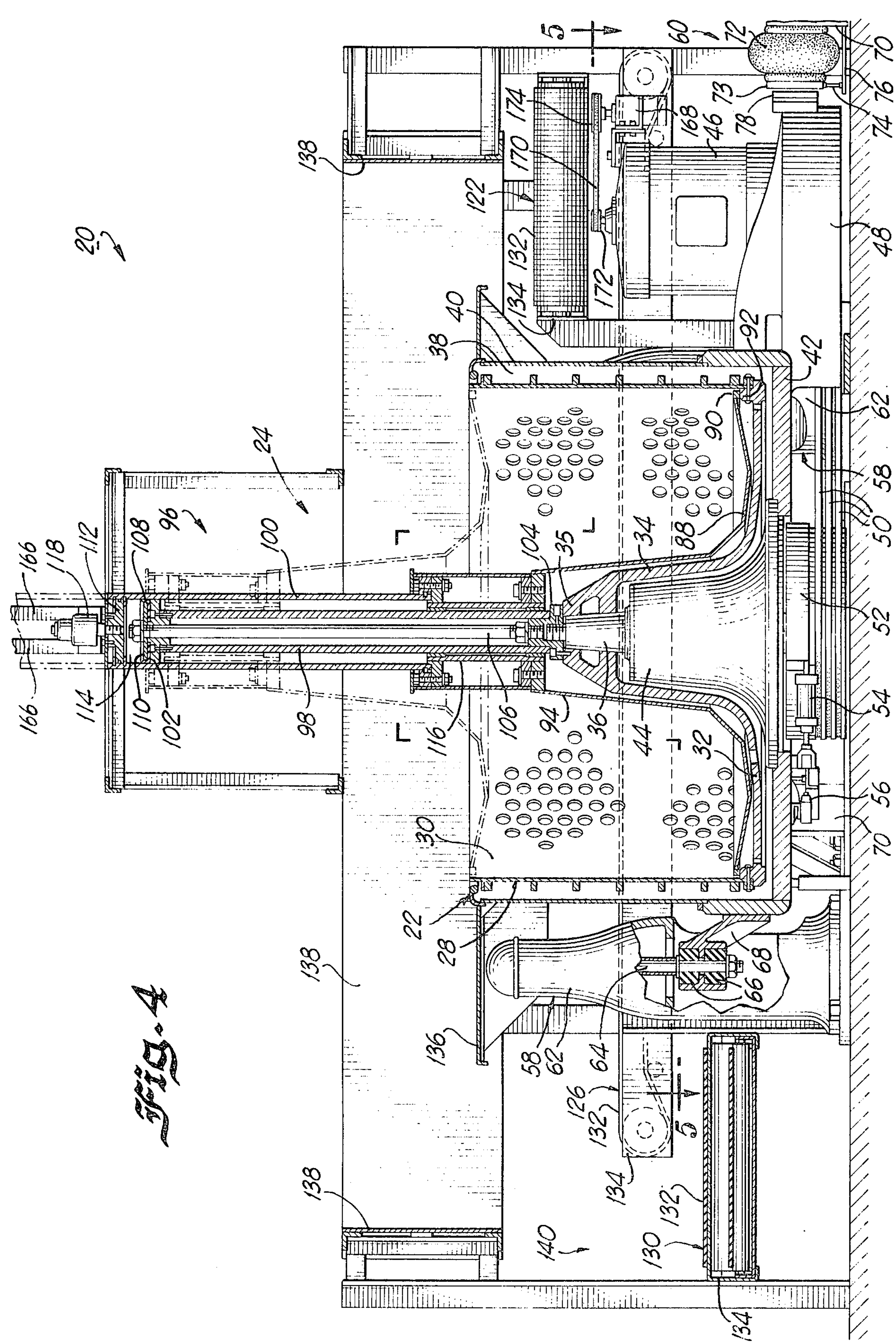
FIG. 4 is a sectional view on an enlarged scale, partly broken away, taken along the line 4—4 of FIG. 1.
Figures 5, 6, 7:
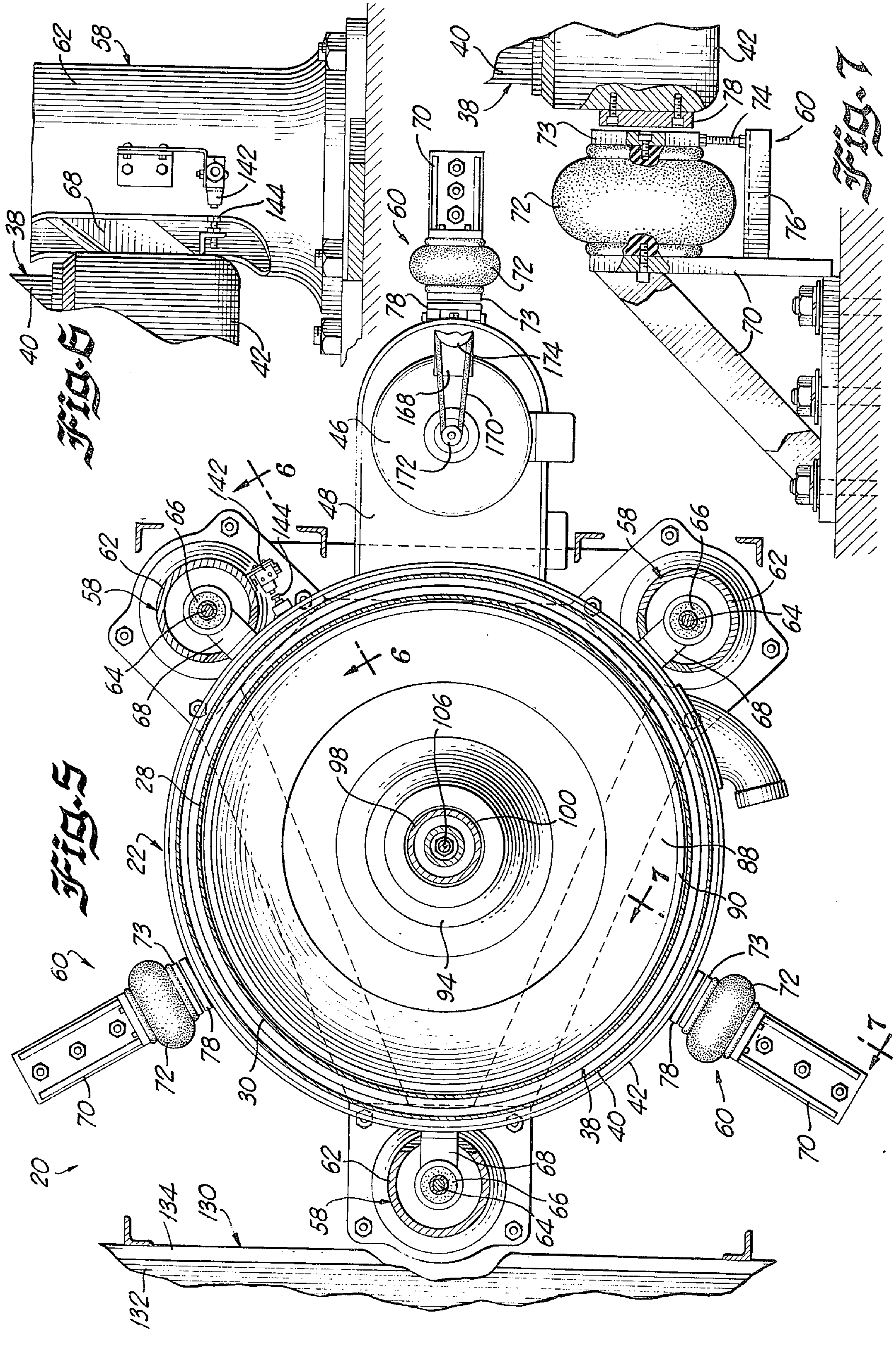
FIG. 5 is a sectional view taken along the line 5—5 of FIG. 4.
FIG. 6 is a sectional view on an enlarged scale taken along the line 6—6 of FIG. 5.
FIG. 7 is a sectional view on an enlarged scale taken along the line 7—7 of FIG. 6.

Vibrations and lateral movement of the basket assembly 22 during rotation of the basket 28 are damped and resisted by a suspension mounting effected by a number of mounting pedestal assemblies 58 and a number of pneumatic biasing assemblies 60. With reference to FIGS. 4 and 5, in the illustrated arrangement three suspension pedestal assemblies 58 are positioned at regularly spaced positions around the rotational axis of the basket assembly 22. Each pedestal includes a housing portion 62 from which depends a rod 64 attached through the agency of resilient spacers 66 to arm members 68 radially extending from the outer casing 38.

With reference to FIGS. 5 and 7, additional stability and resistance to lateral movement of the basket assembly 22 is provided by three pneumatic biasing assemblies 60. These assemblies 60 are regularly or equiangularly spaced around the rotational axis of the basket assembly 22, two of the assemblies being associated with the outer casing wall 40 and one of the assemblies being associated with the motor bracket 48.

Each pneumatic biasing assembly 60 includes a support bracket structure 70 firmly fixed to a supporting bed or floor or the like. An inflatable and expansible, tirelike pneumatic element 72 is interposed between each bracket structure 70 and a pressure member 73 constrained for reciprocal movement by means of a depending arm 74 slidably received in a slide track 76. A pressure pad 78 is radially aligned with each pressure member 73 and is attached to the basket assembly 22. When the pneumatic elements are pressurized, the pressure members 72 are resiliently and yieldingly biased against the pressure pad 78 to stabilize the basket assembly 22 and resist undesirable excessive lateral movement thereof.

As indicated above, one important advantage of the machine 20 of the present invention is that it is well suited for continuous rather than batch processing of laundry material. In order to load wet laundry material into the basket assembly 22, the conveyor array 26 includes a loading conveyor 82 for transporting material from a convenient region near the floor to a raised position over the basket 28 from which it is deposited into the basket. Although conveyors of many types may be used depending upon the nature of the material to be loaded into the machine, in the illustrated centrifugal extractor 20, the conveyor 82 comprises a conventional belt type conveyor including an endless belt 84 supported and driven in conventional fashion by means of a support structure 86 including frame members, drive and idler rollers, and the like.

In order to provide initial balancing or distribution of loaded material around the basket 28, the basket is rotated at a relatively slow speed during the loading operation. The speed control arrangement for carrying out this operation is described below in connection with a description of the operating circuit of the machine 20.

Material may be supplied to the load conveyor 82 manually or in any other desired fashion. It is contemplated that in a largely automated laundry treatment installation, additional conveyors or other material handling equipment may be provided for supplying material to the load conveyor 82 during the loading operation.

Figures 2, 3:
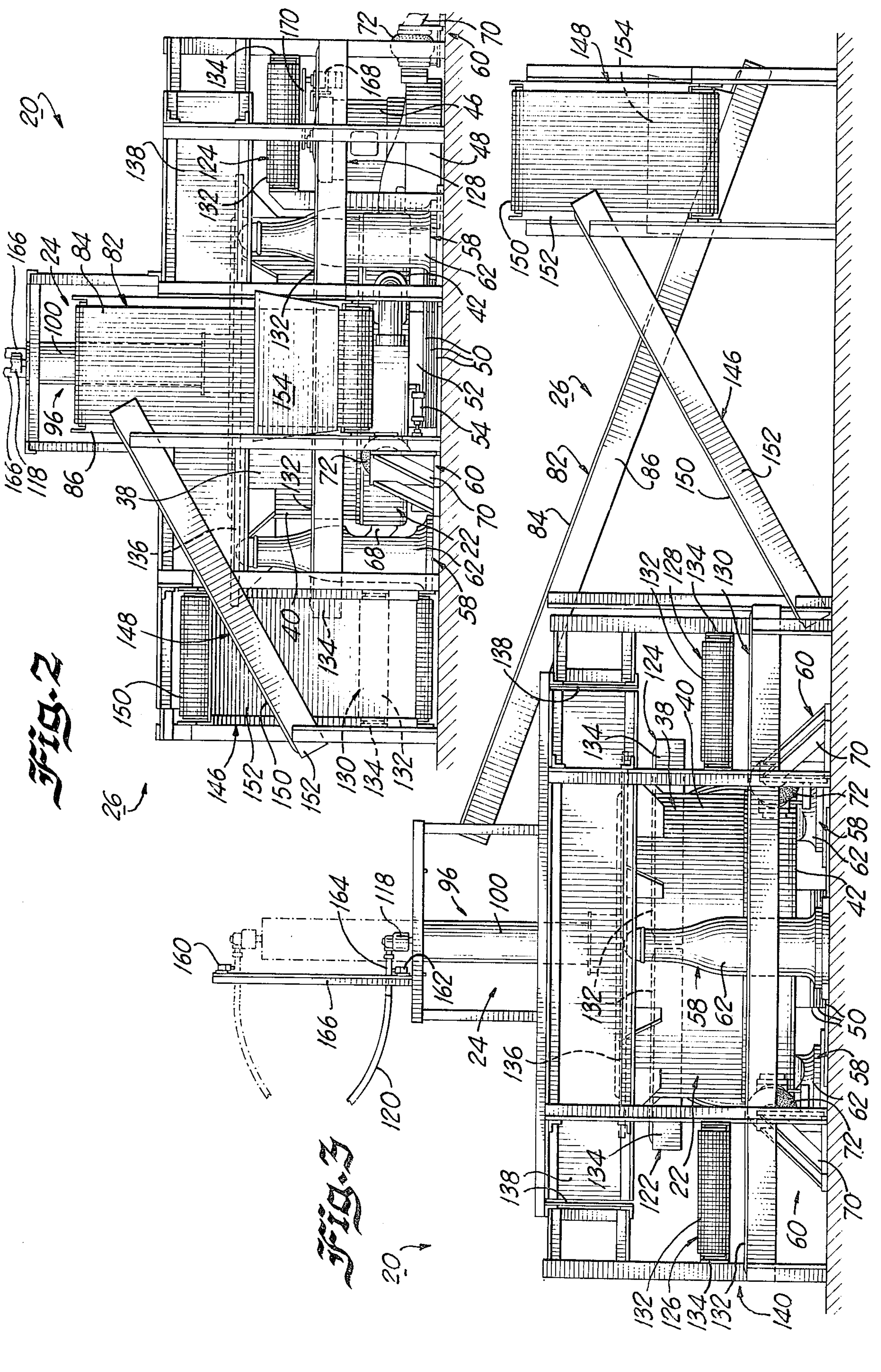
FIG. 2 is a front view of the machine of FIG. 1.
FIG. 3 is a side view of the machine.

One important feature of the present invention relates to the unloading assembly 24 provided for removing material from the basket 28. Referring now more specifically to FIGS. 3 and 4, in accordance with the invention the basket 28 is provided with a movable wall 88 capable of moving material contained within the basket 28 beyond the edge of the outer wall 30. This movement is effected during low speed rotation of the basket 28, and results in centrifugal throwing or ejection of material in all radical directions outwardly from the basket 28 so that the load is not only positively removed in a simple fashion from the basket 28 but also is uniformly distributed into an area surrounding the basket assembly 22.

More specifically, the wall 88 is disposed within the outer wall 30 of the basket 28, and is generally similar in shape to the lower or base wall 32 of the basket. In the normal position of the wall member 88 shown in full lines in FIG. 4, it closely overlies the lower wall 32 and includes an outer rim portion 90 resting upon a ledge or shelf 92 provided on the lower wall 32 for this purpose. A central portion 94 of the wall 88 surrounds and extends beyond the bell-shaped portion 34 of the wall 32 and is connected to an actuator assembly generally designated as 96 serving to move the wall 88 between its normal position and an extended position shown in broken lines in FIG. 4.

Actuator assembly 96 is in the illustrated arrangement adapted to be fluid operated and includes a piston sleeve or tube 98 telescoped within a cylinder sleeve or tube 100. The piston tube is fixed to the outermost end of the bellshaped portion 34 of the basket wall 32 and the actuator assembly rotates together with the basket. More specifically, the tube 98 is captured between an upper cap member 102 and a lower cap member 104 attached to the wall portion 34. A piston support rod 106 holds the piston 98 firmly in place and also serves to capture a seal member or gasket cap 108 betweeen the upper cap member 102 and a gasket retainer 110.

The cylinder sleeve or tube 100 is slidably carried over the piston sleeve 98 with its inner surface in slidable sealing relation with the cup or gasket 108. The upper end of the cylinder 100 is closed by a cylinder cap member 112 and defines an expansible sealed chamber 114. In order to provide for firmly guided sliding movement of the cylinder 100 and the movable wall 88, the lower end of the cylinder 100 carries a guide tube 116 closely surrounding and slidable along the outer surface of the piston sleeve 98. The lowermost end of the guide tube 116 is attached to the outermost end of the center portion 94 of the movable wall 88.

In order to provide for pressurization of the chamber 114 thereby to effect outward unloading movement of the movable wall 88, a rotary union 118 is carried by the cylinder cap 112 and is in fluid communication with the chamber 114. A flexible conduit 120 permits the application of pressurized fluid to the actuator assembly 96 in the various positions of the rotary union 118.

One advantage of the unloading assembly 24 is that material unloaded from the basket assembly 22 is distributed rather than bunched upon unloading. In accordance with the invention, the conveyor array 26 includes conveyors effective to remove unloaded material from the machine 20 while maintaining it in a distributed condition.

Figure 8:
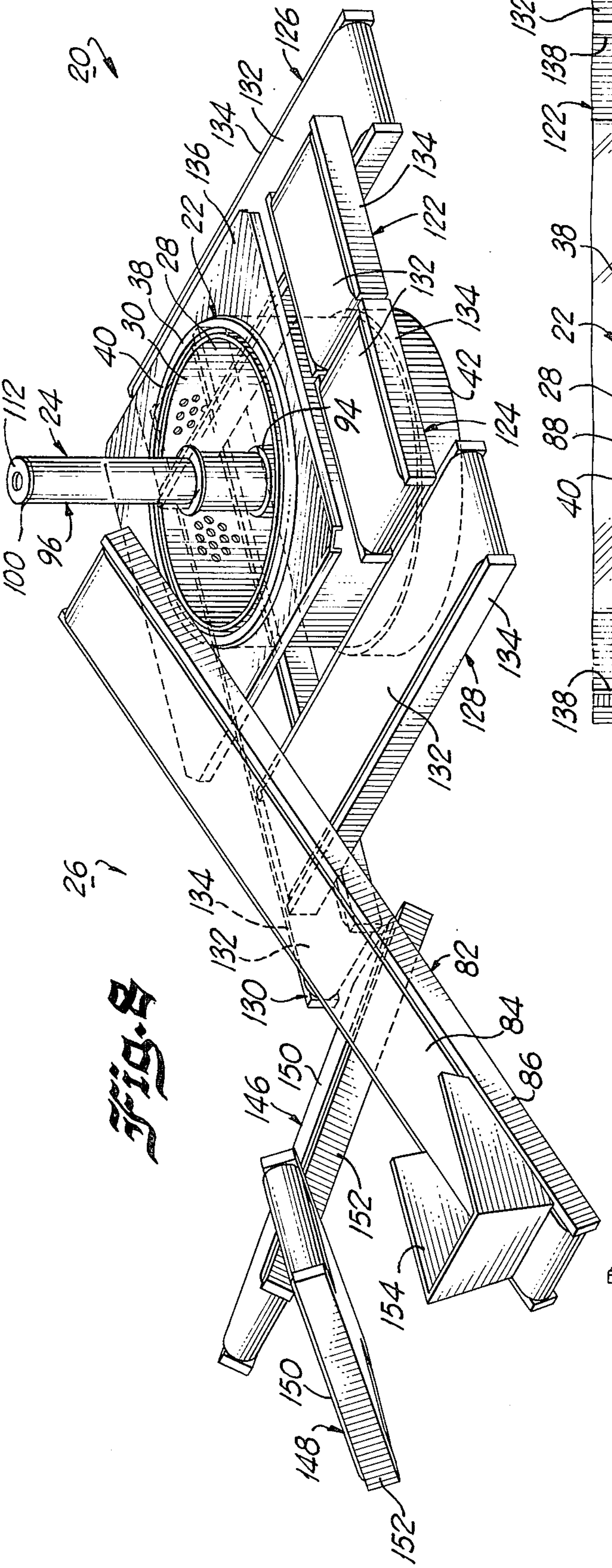
FIG. 8 is a simplified perspective view on a reduced scale illustrating the positions of certain components of the machine of FIG. 1.

More specifically, and referring now to FIGS. 1 and 8, the conveyor array 26 includes a number of material collection conveyors 122, 124, 126, 128 and 130 arranged in a closed pattern surrounding the basket assembly 22. In the illustrated arrangement of conveyors, the conveyor 130 serves also as a discharge conveyor for moving unloaded material from the machine 20 either at the end of an extraction operation, or as described below, during a load recycle operation. Each of the conveyors 122–130 is of a conventional belt conveyor construction and includes an endless belt 132 mounted on conventional supporting structure 134.

In order to retain and guide material centrifugally thrown from the rotating basket 28, the outer end of the cylindrical basket wall 30 is surrounded by a shelf or table member 136 extending from the basket periphery to the collection conveyors 122–130. Excessive outward movement of unloaded material is prevented by means of a retaining wall or stop structure 138 disposed above the collection conveyors 122–130 and supported by a suitable arrangement of frame members. If desired, the top of the machine 20 above and within the retaining wall or stop structure 138 may be covered by a suitable grating or cover member (not shown) in order to prevent the possibility of inadvertent throwing of material beyond the machine 20 and also to serve as a guard structure limiting access to the interior of the machine.

As can best be seen in FIG. 8, conveyors 122 and 124 are similar to one another and are disposed above similar conveyors 126 and 128. In operation, the conveyors 122 and 124 move in opposite, diverging directions so that material unloaded unto these conveyors is moved to the sides and discharged onto conveyors 126 and 128 respectively. Conveyors 126 and 128 move in the same direction and serve to move material onto the collection and discharge conveyor 130. In order to maintain distribution of unloaded material without causing undesirable bunching of the material, after operation of the unloading assembly 24, it is desirable that the collection and discharge conveyor 130 be operated first for a period of time prior to operation of the remaining collection conveyors. After conveyor 130 has been operated long enough to be emptied, the remaining collection conveyors 122 and 124 are operated so that the remaining material in distributed fashion is moved onto the conveyor 130 and is then moved from the machine 20.

At the end of an extraction operation, the conveyor 130 is operated in a direction to move unloaded material to a discharge region designated by the reference numeral 140. The discharge material may be received in a cart or the like for manual movement to subsequent equipment such as a laundry drying machine or the like. Alternatively, in an automated installation, additional conveyors or material handling mechanisms may be provided for transporting material for further treatment from the discharge region 140 of the machine 20.

In accordance with an important feature of the present invention, the machine 20 is provided with the capability of sensing a predetermined load imbalance and for automatically carrying out a sequence of operations to rebalance the load for the desired smooth operation of the machine. In accordance with the invention, this operation is initiated by an imbalance sensing switch 142. As indicated above, the suspension pedestal assemblies 58 and the pneumatic biasing assemblies 60 provide resistance to lateral movement resulting from eccentric rotation of the basket 28 when the load is not in balance. However, when an imbalance greater than a predetermined limit is encountered, the lateral movement of the basket assembly 22 becomes undesirably large and can be destructive. With reference to FIG. 5, when a predetermined amount of lateral movement occurs, the imbalance sensing switch 42, carried on one of the pedestal assemblies 58, is operated by means of a switch operator assembly 144 carried on the wall 40 of the outer casing or enclosure 38. As described below in connection with a description of the control circuit of the machine 20, operation of the switch 142 during an extraction operation initiates an automatic load distribution.

Redistribution of the load is effected by reducing the basket speed to a relatively low level and then by operating the unloading assembly 24 to eject material from the basket 28 to the collection conveyors 122–130. The discharge conveyor 130 is operated in a direction to move unloaded material while in a distributed array to a pair of recycle conveyors 146 and 148. Each of these conveyors comprises a conventional belt conveyor including an endless belt 150 and conventional support structure 152.

As best seen with reference to FIG. 8, during a recycle operation, material from the conveyor 130 is deposited onto the upwardly inclined recycle conveyor 146 and then onto the upwardly inclined recycle conveyor 148. From the conveyor 148 material is deposted onto the loading conveyor 82 which is operated to return the distributed load to the basket assembly 22. This process of unloading material and recycling it for reloading into the basket assembly 22 causes the material to be widely distributed in a relatively random pattern and to be reloaded in a distributed condition so that imbalance conditions are overcome.

Figure 9:
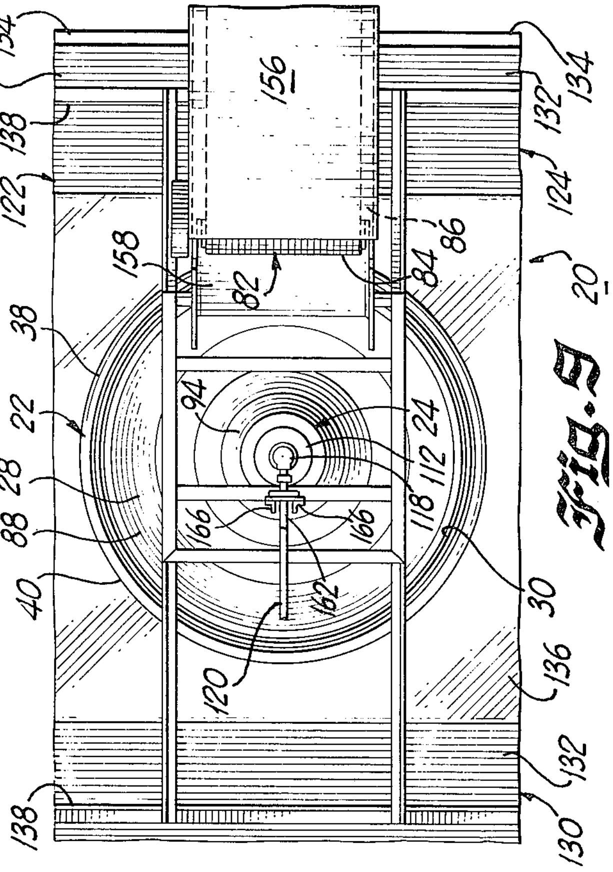
FIG. 9 is a fragmentary top view of a portion of a modified version of the machine.
Figure 10:
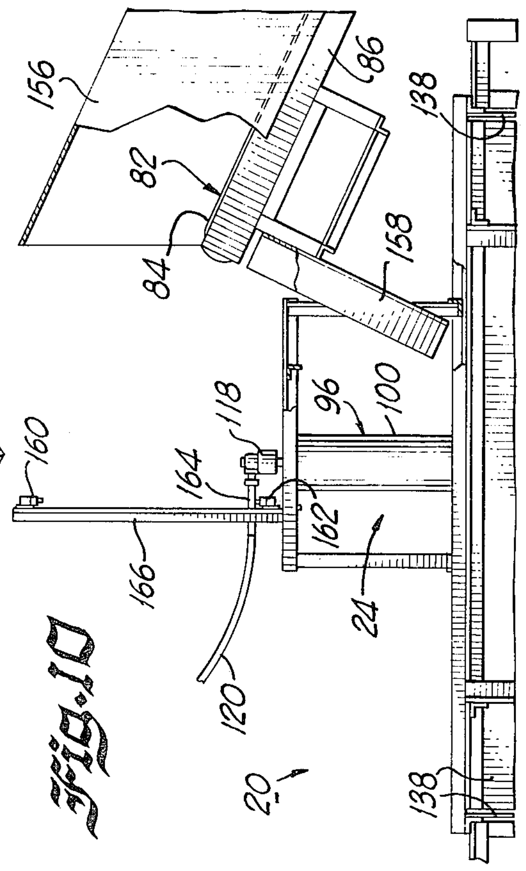
FIG. 10 is a partial side view of the machine of FIG. 9.

Rotary centrifugal machines may be designed to accommodate materials of many types, and the conveyor array 26 may be designed accordingly. For example, the conveyors of the array 26 may be provided with suitable guiding structure for preventing material from falling off of the conveyors. Thus, as illustrated in FIGS. 1–8, the loading conveyor 82 is provided at its inlet end with a guide member 154 so that material loaded onto the conveyor does not fall from the sides or end. With reference to FIGS. 9 and 10, the loading conveyor is provided with an enclosure structure 156 for maintaining material on the belt 84 and for guarding the conveyor mechanism. A fixed chute 158 is provided for guiding material from the discharge end of the loading conveyor 82 into the basket assembly 22.

Before proceeding to a description of the control circuit for the machine 20, it should be noted that the machine 20 is provided with additional control switches responsive to its operational condition. With reference to FIG. 3, it can be seen that a pair of switches 160 and 162 are associated with the actuator assembly 96 of the unloading assembly 24. More specifically, flexible conduit 120 is interconnected with rotary union 118 by means of a rigid coupling or segment 164. As appears in FIGS. 1 and 4, segment 164 is captured between a pair of vertically extending guide rails 166. Switches 160 and 162 are carried by rails 166 in position to be operated respectively when the wall 88 is in its upper and lower positions.

A speed sensing assembly 168 is associated with the drive motor 46 and is best illustrated in FIGS. 2 and 5. The assembly is coupled for rotation at a speed proportional to drive motor rotation by means of a drive belt 170 movable on pulleys 172 and 174. As will appear below, the speed sensing assembly 168 includes switch contacts adapted to be operated at predetermined rotational speeds of the drive motor 146 corresponding to predetermined basket rotation speeds. For example, the switch contacts may be operated by centrifugal force or in any other conventional fashion.

Figure 11:
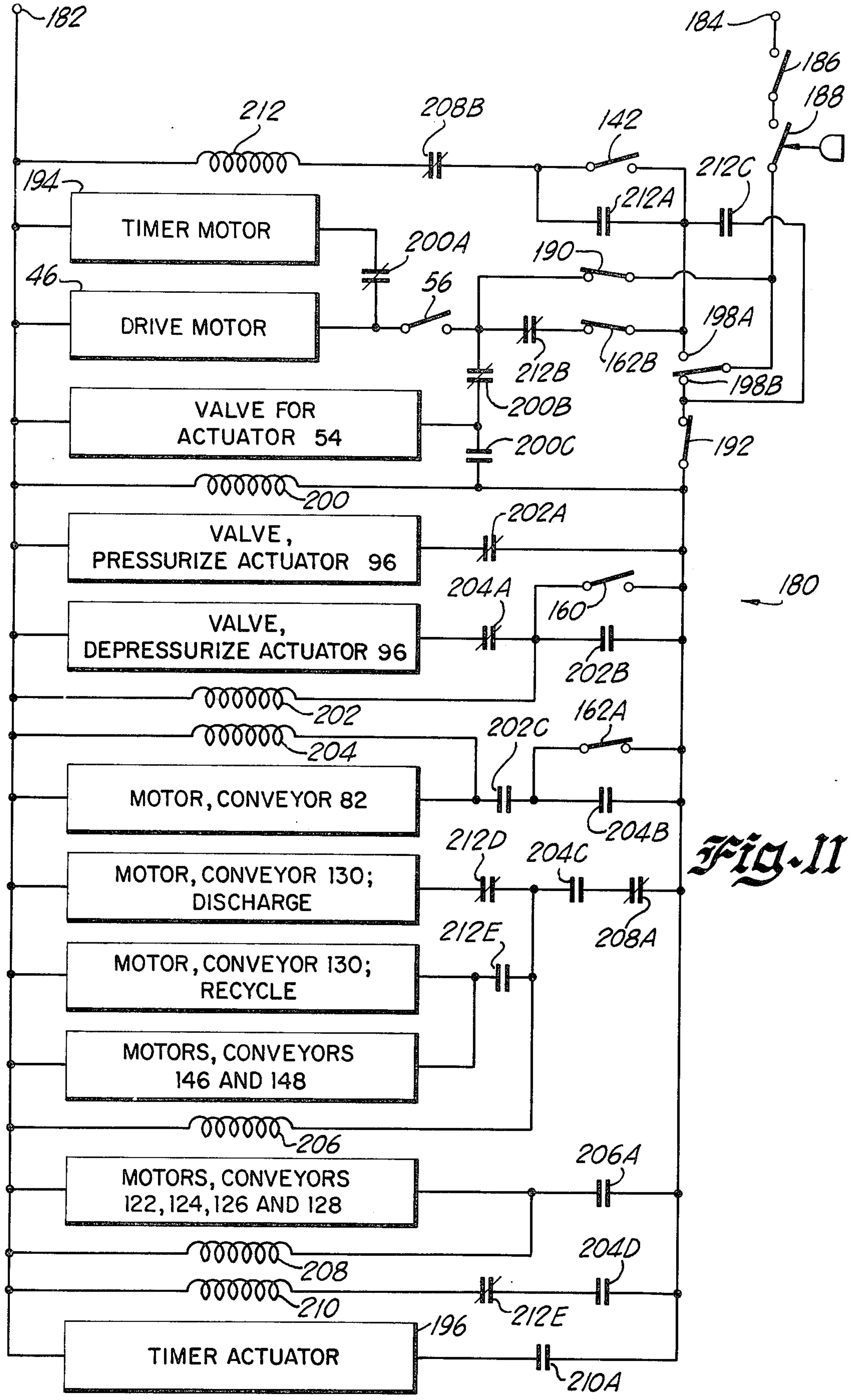
FIG. 11 is a schematic diagram of portions of a control circuit for the machine of FIG. 1.

Having reference now to FIG. 11, there is illustrated in schematic and block diagram form a simplified control circuit for the machine 20, the circuit being designated in its entirety by the reference numeral 180. In general, the control circuit 180 includes a pair of power supply terminals 182 and 184 adapted to be interconnected with a power source by way of suitable fuses, transformer, safety interlock switches and the like as will be well understood by those skilled in the art. The circuit 180 controls the energization of the drive motor 26, the actuators 54 and 96, and the conveyors 82, 122–130, 146 and 148 in order to carry out loading operations, extraction operations, unloading operations, and load redistribution or recycling operations.

It should be appreciated with reference to FIG. 11, that in many respects the circuit 180 is shown in a simplified form for purposes of clarity. For example, in connection with motors, electrically operated valves and the like, isolation relays, motor and value windings, and components of pneumatic and hydraulic circuits are omitted. The design and use of these items is well within the capability of one skilled in the art, and complete disclosure thereof in the present application is not believed to be necessary to an understanding of the invention.

The circuit 180 is illustrated in a standby condition prior to carrying out an unloading and loading operation. In order to start up the machine, an on-off switch 186 is closed. A pressure operated switch 188 in series with switch 186 serves to prevent operation of the machine 20 when the pneumatic biasing assemblies 60 are not pressurized. Consequently, switch 188 is controlled by a pressure sensing device in the pneumatic circuit supplying the assemblies 60, to the end that switch 188 is closed only when the biasing assemblies 60 are effective with the pressure members 73 biased into contact with the pressure pads 78.

The speed sensing assembly 168 includes a pair of normally closed sets of switch contacts 190 and 192. Operated centrifugally or otherwise to open at predetermined motor speeds. Switch 190 is adjusted to open at a relatively low motor speed corresponding to, for example, perhaps 100 revolutions per minute of the basket 28. Switch 192 is adjusted to open at a somewhat higher speed such as that corresponding, for example, to 150 revolutions per minute of the basket 28.

In order to control the duration of a high speed extraction operation or cycle of the machine 20 in a manner described in more detail below, the control circuit 180 includes a timer comprising a timer motor 194 and a timer actuator 196 connected in controlling relation to a normally open set of timer contacts 198A and a normally closed set of timer contacts 198B. The arrangement is such that upon energization of the timer actuator 196, the contacts are operated from the illustrated condition to the alternate condition in order to initiate a time period of predetermined duration. During this time period, the timer motor 194 operates for a predetermined aggregate time, after which contacts 198A and 198B are returned to their original illustrated condition.

When switches 186 and 188 are closed, a circuit is completed through closed timer contacts 198B and the closed speed responsive switch 192 for energization of the winding of a relay 200 having normally closed contacts 200A and 200B and normally open contacts 200C. Closure of contacts 200C completes a circuit for energization of a solenoid operated valve connected in controlling relation to the pneumatic actuator 54. Consequently, the actuator 54 is pressurized (FIG. 4) and the brake assembly 52 is released in order to permit rotation of the basket 28. Operation of the actuator 54 results in closure of the brake sensing switch 56.

Relay contacts 200A open in response to energization of relay 200 thereby preventing energization of the timer motor 194. In this manner it is assured that the duration of the timed extraction cycle is not shortened prior to initiation of the high speed extraction operation.

In view of the fact that the low rpm speed sensing switch 190 is closed at initiation of operation of the machine 20, a circuit is completed to the drive motor 26 through the switch 190 and through the closed brake sensing switch 56. Energization of the motor results in rotation of the basket 28, and the speed of the basket increases until it reaches a level sufficient to open the switch 190. The motor 26 is intermittently energized thereafter by opening and closing of the switch 190 in order to maintain the basket rotational speed at approximately the speed required for operation of the switch 190.

While the basket 28 continues to rotate at its relatively low speed, an unloading and loading sequence of operation of the machine 20 is carried out by the circuit 180. During this sequence, the unloading assembly 24 is operated to remove all material from the basket assembly 22. Thereafter the conveyor array 26 is operated to move all material from the collection conveyors 122–130 and from the machine 20. In addition, the loading conveyor 82 is operated to load material into the basket assembly 22 for a subsequent extraction operation.

More specifically, the speed sensing switch 192 remains closed during cycling operation of the switch 190 since switch 192 is set for opening at a higher speed. Consequently, a circuit is completed through a set of normally closed contacts 202A of a relay 202 for energization of an electrically operated valve connected in controlling operation to the actuator 96. As a result, the actuator 96 is pressurized by the application of pressurized fluid through the conduit 120 to the expansible chamber 114. Movable wall 88 rises to lift material present within the basket 28 beyond the cylindrical wall 30 for ejection from the basket assembly 22 and onto the conveyors 122–130.

When the wall 88 reaches its uppermost position, the upper position sensing switch 160 is operated from its normally open to its closed position, at which time the winding of relay 202 is energized. Contacts 202A of relay 202 open to break the circuit to the valve controlling pressurization of the actuator 96, while a normally open set of contacts 202B close to maintain a circuit for energization of relay 202 in parallel with the switch 160. Closure of switch 160 also completes a circuit through a normally closed set of relay contacts 204A to energize a solenoid valve for depressurizing the actuator 96 so that wall 88 is permitted to descend to its normal operating position. It should be understood that the elements illustrated as separate valves for controlling actuator 96 may comprise a pair of solenoid windings associated with a conventional three-way valve.

Upon return of wall 88 to its normal position, the lower position sensing switch 162 is operated to close a normally open set of contacts 162A associated therewith. By virtue of energization of relay 202, normally open relay contacts 202C are closed and a circuit is completed for energization of a drive motor associated with the load conveyor 82 so that this conveyor is placed into operation. Material comprising the next load for the machine 20 can be placed on the coveyor 82 at this time.

Simultaneously the winding of relay 204 is energized. Normally closed contacts 204A are opened to open the circuit to the valve controlling depressurization of the actuator 96 and to return the actuator to a quiscent condition. Normally open contacts 204B close to complete a circuit in parallel with the switch contacts 162A for maintaining energization of the relay 204.

Operation of relay 204 also initiates operation of conveyors 122–130 for discharging material unloaded from the basket 28. More specifically, relay contacts 204C close to complete a circuit for energization of a drive motor connected to operate conveyor 130 in the discharge direction. As a result, material present on the conveyor 130 is moved to the discharge region 140.

Simultaneously with energization of the motor of conveyor 130, a time delay relay 206 is energized. After a time delay of sufficient duration to insure discharge of all material from conveyor 130, a normally open set of relay contacts 206A close to complete a circuit for energization of drive motors associated with the conveyors 122, 124, 126 and 128. Thus material unloaded onto these conveyors is advanced to the conveyor 130 and discharged from the machine.

Coincident with energization of the motors for conveyors 122–128 by closure of contacts 206A, the winding of a second time delay relay 208 is energized. The time delay period of relay 208 is chosen to assure complete discharge of all material from the collection conveyors 122–130. After this time delay period has elasped, a normally closed set of contacts 208A opens to prevent further energization of the motor associated with conveyor 130. Because contacts 208A also are in circuit with the winding of relay 206, the circuit for energization of the motors associated with conveyors 122–128 is opened at this time as well.

It will be recalled that relay 204 is energized upon closing of the lower position sensing switch contacts 162A simultaneously with energization of the motor of conveyor 82. Relay 204 includes a normally open set of relay contacts 204D in series with a time delay relay 210. The duration of time delay relay 210 is chosen to permit ample time for loading of material into the basket assembly 22 by the conveyor 82. After loading, relay 210 operates and a normally open set of relay contacts 210A close to complete a circuit for energization of the timer actuator 196. This signals the beginning of a high speed extraction operation.

More specifically, upon energization of timer actuator 196, the timer controlled contacts 198A are operated to the closed condition while contacts 198B are operated to the open condition. The latter operation disconnects all circuits for energization of the motors associated with the conveyors of the conveyor array 26 and furthermore disconnects circuits for energization of the valves associated with actuator 96. Although the previously established circuit for energization of the valve for actuator 54 is opened by opening of contacts 198B, and alternate circuit for maintaining the brake assembly 52 disengaged is established at this time. This circuit is established through contacts 198A and normally closed contacts 200B.

It is important to assure that the basket 28 is not driven at high speeds while the wall 88 is not in its normal lower position. For this reason, the lower position sensing switch 162 includes normally open contacts 162B in circuit between the contacts 198A and the drive motor 26. Thus, if wall 88 is not in its fully lowered position, the motor 26 cannot be energized. In addition, if contacts 162B are open at this time, actuator 54 cannot be pressurized and the brake assembly 52 cannot be released.

The relatively low rpm speed sensing switch 190 is bypassed by closing of the contacts 198A and the drive motor 26 is continuously energized to drive the basket 28 at a higher extraction speed. Both switches 190 and 192 open in response to the higher speed, the opening of the switch 192 assuring that an unloading operation cannot be commenced when the basket 28 is revolving at a speed exceeding a predetermined desired maximum speed.

At the beginning of an extraction cycle when relay 200 is deenergized, contacts 200A return to their normally closed condition to connect the timer motor 194 in parallel with the drive motor 26. Consequently, the timer motor 194 is effective to time an extraction cycle of predetermined duration. During the extraction cycle, the basket 28 reaches a maximum speed determined by physical parameters such as motor size and the like. Fluids are extracted from material disposed within the basket 28 and are discharged from the casing 38.

Assuming that the load is properly balanced during the loading operation, the extraction operation continues uninterrupted throughout its predetermined duration. At the end of the extraction cycle, the timer motor 194 operates the contacts 198A and 198B to their original illustrated condition. Consequently, the circuit for energization of the drive motor 26 is interrupted. In view of the fact that the basket 28 is revolving at high speed at this time, both of the switches 190 and 192 are open. The circuit for energization of the valve associated with actuator 54 is broken by opening of contacts 198A and no alternate circuit is established through the switch 190. Consequently, the actuator 54 is depressurized and the brake assembly 52 is operated to slow the basket 28. When the basket 28 slows to the predetermined speed chosen for operation of switch 192, switch 192 closes to reestablish a circuit for a subsequent unloading and loading sequence.

At this time relay 200 is reoperated in order to effect releasing of the brake assembly 52 in the manner described above and disconnecting the timer motor 194. The basket 28 slows further to the speed chosen for operation of the switch 190, and thereafter the switch 190 alternately energizes and deenergizes the drive motor 26 at its relatively low speed. Another load sequence identical to that described above takes place during which material within the basket 28 is unloaded by the unloading assembly 24 and by the conveyor array 26 and during which a next load of material is loaded into the basket assembly 22 by the loading conveyor 82.

In accordance with the invention, if the material loaded into the basket assembly 22 is not initially balanced, the circuit 180 operates the machine 20 in order automatically to redistribute the load to bring about a balanced condition. This recycling operation is initiated by closing of the imbalance sensing switch 142 described above. In response to operation of switch 142, the operation of the timer motor 194 is temporarily discontinued while the basket 28 is slowed, the material in the basket 28 is unloaded by the unloading assembly 24, and the unloaded material while in distributed condition is collected, recycled and reloaded into the basket 28. After distribution and reloading of the material, the rotational speed of the basket is once again increased and the timed high speed extraction cycle continues until completion.

More specifically, when the imbalance sensing switch 142 closes, a circuit is completed through closed timer contacts 198A for energization of a recycle relay 212. Normally open contacts 212A close to maintain relay 212 in its energized condition following reopening of switch 142. Normally closed contacts 212B open to disconnect the circuit to the drive motor 26 so that the motor begins to slow. In addition, opening of contacts 212B opens the circuit to the valve supplying the pneumatic actuator 54 to the end that the brake assembly 52 is applied to slow the rotating basket 28.

A normally open set of relay contacts 212C associated with the recycle relay 212 close at the beginning of a recycle operation to extend a circuit from closed contacts 198A through speed responsive switch 192 to the relay 200 and to the circuitry associated with the unloading assembly 24 and the conveyor array 26. Consequently, when the basket 28 slows to the speed at which switch 192 closes, relay 200 is energized.

As a result of energization of relay 200, contacts 200A open to disconnect the timer motor 194 to the end that the timing of the high speed extraction operation is temporarily discontinued. Contacts 200B open and contacts 200C close at this time as well in order to provide a circuit for energization of the valve controlling the actuator 54 so that the brakes are released when a low speed is reached. As the speed decreases somewhat more, the speed responsive switch 190 closes and thereafter cycles between open and closed positions to maintain the basket 28 at a relatively low rotational speed.

Another result of closure of the speed responsive switch 192 is the completion of a circuit through normally closed relay contacts 202A for energizing the valve serving to pressurize the actuator 96 thereby effecting lifting of the wall 88 of the unloading assembly 24. When the actuator reaches its uppermost position, switch 160 closes to complete a circuit through normally closed relay contacts 204A for energization of the valve serving to depressurize the actuator 96 so that the actuator once again moves to its lower position. Raising of the wall 88 results in centrifugal unloading of the unbalanced material from basket 28 and onto the collection conveyors 122–130.

Relay 202 is also energized by closing of switch 160. Contacts 202A open to deenergize the valve pressurizing the actuator 96 and to permit its return movement to the original position. Contacts 202C close to prepare a circuit for energization of the motor associated with the conveyor 82. When the actuator 96 completes its downward movement, this circuit is energized by closing of switch contacts 162A so that the conveyor 82 is placed into operation.

Relay 204 is also energized at this time by closing of contacts 162A. Its contacts 204B close to maintain a circuit to relay 204 independent of switch contacts 162A. Relay contacts 204A open to disconnect the circuit for energizing the valve associated with actuator 96. Normally open contacts 204C close to complete a circuit for operating the conveyor 130 and the recycled conveyors 146 and 148. More specifically, it should be noted that normally closed recycle relay contacts 212D open and normally open contacts 212E close in response to energization of relay 212 during a recycle operation. Consequently, the conveyor 130 is controlled during a recycle operation to move in the direction for conveying material to the recycle conveyor 146 rather than to the discharge area 140. Thus, upon closing of contacts 204C, conveyor 130 begins to operate and to move material to the operating conveyors 146 and 148 so that all material unloaded from the basket 28 onto conveyor 130 is reloaded into the basket 28. Although separate motors are shown in block form for moving conveyor 130 in its alternate directions, the same result may be achieved by using a single motor controlled to operate or to drive the conveyor in two directions.

Also in response to closing of contacts 204C, the time delay relay 206 is operated. As described above, this relay is characterized by a delay in operation sufficient to permit all material to be conveyed from the conveyor 130. After this time delay expires, relay contacts 206A close to complete a circuit for energization of the motors associated with the collection conveyors 122–128. Consequently, material unloaded onto these conveyors is moved to the conveyor 130 and thence by way of the recycle conveyors 146 and 148 to the loading conveyor 82 and is returned to the basket 28.

Coincident with operation of the collection conveyors 122–128, time delay relay 208 is operated. This relay exhibits a time delay sufficient for all material to be recycled to the basket 28 before its contacts are actuated. At the end of the time delay period of relay 208, all material has been recycled in a distributed array to the basket 28, and relay contacts 208B are operated from their normally closed to their normally open position. Consequently, the circuit for energization of the recycle relay 212 is opened and its contacts return to their original illustrated position. The effect of deenergization of relay 212 is to return the circuit 180 to its prior condition wherein a high speed extraction operation is carried out. More specifically, the drive motor 26 is once again operated independently of the speed responsive switch 190, while timer motor 194 is reenergized to continue the remaining duration of the timed cycle of operation.

Although the present invention has been described with reference to details of the illustrated embodiment thereof, it should be understood that such details are not intended to limit the scope of the invention as defined in the following claims.

What is claimed and desired to be secured by Letters Patent of the United States is:

1. A rotary centrifugal machine comprising in combination:

casing means mounted for rotation around a rotational axis;

drive means for rotating said casing means;

loading conveyor means for loading material into said casing means;

sensing means for sensing a predetermined load imbalance in said casing means;

unloading means for unloading material from said casing means;

collection conveyor means for accepting unloaded material from said unloading means;

discharge conveyor means for receiving material from said collection conveyor means and for delivering material to said load conveyor means;

and control means operative in response to operation of said sensing means for redistributing an imbalanced load by operating said unloading means, said collection and discharge conveyor means, and said load conveyor means.

2. The machine of claim 1, said control means including speed regulating means connected to said drive means for rotating said casing means at a first relatively slow speed during operation of said load conveyor means and at a second higher speed after loading of material into casing structure; and means coupled between said sensing means and said speed regulating means for slowing said casing means to said first speed prior to operation of said unloading means.

3. The machine of claim 2, said unloading means comprising means for moving material from said casing means in a direction generally parallel to the rotational axis for centrifugal ejection radially from said casing means, said collection and discharge conveyor means surrounding the periphery of said casing means.

4. The machine of claim 3, said casing means including a generally cylindrical casing wall generally symmetrical about said axis of rotation, an end wall at one end of and connected to said cylindrical casing wall, said unloading means including an inner wall overlying said end wall within said cylindrical casing wall, and means mounting said inner wall for movement from a normal position adjacent said end wall and an unloading position adjacent the opposite end of said cylindrical casing wall.

5. The machine of claim 1, said discharge conveyor means including a discharge conveyor movable in a first direction for directing material toward said load conveyor means and movable in a second direction for discharging material from the machine.

6. The machine of claim 1, said casing means being fluid permeable, and an enclosure surrounding said casing means.

7. A rotary centrifugal machine comprising a generally cylindrical enclosure, a generally cylindrical casing structure mounted for rotation within said enclosure around a generally vertical rotational axis; a plurality of flexible supports connected to said enclosure for supporting said enclosure and casing structure, drive means connected to said casing structure for rotating said casing structure; a plurality of suspension devices disposed at spaced positions around said enclosure for resisting lateral movement of said enclosure due to eccentric movement of said casing structure; a load conveyor extending over said casing structure for depositing material into said casing structure; said casing structure including a generally cylindrical casing wall and an unloading mechanism including a generally horizontal wall movable vertically within said casing wall for raising material within said casing structure above said casing wall; and speed control means for rotating said casing structure at a relatively slow first speed during operation of said load conveyor, and during operation of said unloading mechanism, and for rotating said casing structure at a relatively fast second speed following operation of said load conveyor, and sensing means responsive to predetermined lateral movement of said casing structure for operating said unloading mechanism.

8. The machine of claim 7 further comprising material collection means surrounding said casing structure for collecting unloaded material.

9. The machine of claim 8, said collection means comprising material conveying means.

10. The machine of claim 9 further comprising recycle conveyor means for moving material from said material conveying means to said load conveyor.

11. A method of balancing a load of material in a rotary centrifugal structure comprising the steps of:

rotating the structure;

sensing imbalance of a load in the structure during rotation;

releasing the material from within the structure and centrifugally ejecting the material from the structure in all radial directions in response to the sensed imbalance;

collecting the ejected material while substantially maintaining the material in distributed condition; and loading the collected distributed material into the structure.

12. The method of claim 11, said releasing step comprising moving the material in a direction generally parallel with the rotational axis.

13. The method of claim 11, said sensing step comprising permitting lateral movement of the structure, and detecting lateral movement exceeding a predetermined limit.

14. The method of claim 11 further comprising slowing the structure after said sensing step and prior to said releasing step.

15. A rotary centrifugal machine comprising in combination:

a casing structure mounted for rotation around a rotational axis;

drive means coupled to said casing structure for rotating said casing structure;

first conveyor means for loading material into said casing structure;

sensing means for sensing a load imbalance in said casing structure;

means for unloading material from said casing structure;

second conveyor means for accepting unloaded material and reloading material into said casing structure; and control means controlled by said sensing means for operating said unloading means and said second conveyor means.

16. The machine of claim 1 further comprising speed control means for slowing said casing structure in response to operation of said sensing means.

* * * * *